(12) United States Patent
Méndez Arévalo et al.

(10) Patent No.: US 11,919,473 B2
(45) Date of Patent: Mar. 5, 2024

(54) SEATBELT BUCKLE VIBRATION

(71) Applicant: Ford Global Technologies, LLC, Dearborn, MI (US)

(72) Inventors: Lorena Virginia Méndez Arévalo, CDMX/Azcapotzalco (MX); Manuel de Jesús Vazquez Morales, Pachuca de Soto/Hidalgo (MX); Daniel Ivan Ostria Delgadillo, Pblo Santa Barbara/Mexico City (MX); Jose Ernesto Simon Gonzalez, Culiacan/Sinaloa (MX)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 17/380,355

(22) Filed: Jul. 20, 2021

(65) Prior Publication Data
US 2023/0027717 A1 Jan. 26, 2023

(51) Int. Cl.
*B60R 22/28* (2006.01)
*B60R 22/34* (2006.01)
*G01P 13/00* (2006.01)
*B60R 21/015* (2006.01)

(52) U.S. Cl.
CPC ............ *B60R 22/28* (2013.01); *B60R 22/341* (2013.01); *G01P 13/00* (2013.01); *B60R 21/01544* (2014.10); *B60R 2022/281* (2013.01); *B60R 2022/284* (2013.01)

(58) Field of Classification Search
CPC ....... B60R 22/48; B60R 22/38; B60R 22/341; B60R 22/357; B60R 21/01544; B60R 21/01546; B60R 21/01548; B60R 2022/4816
See application file for complete search history.

(56) References Cited

U.S. PATENT DOCUMENTS

| | | | |
|---|---|---|---|
| 6,992,571 B2 | 1/2006 | Ota et al. | |
| 9,403,489 B2 | 8/2016 | Ghannam et al. | |
| 2009/0322507 A1 | 12/2009 | Aoki et al. | |
| 2017/0291576 A1 | 10/2017 | Le et al. | |
| 2021/0394710 A1* | 12/2021 | Hu | B60W 40/09 |

FOREIGN PATENT DOCUMENTS

DE 102013001323 B3 3/2014

* cited by examiner

*Primary Examiner* — Syed A Islam
(74) *Attorney, Agent, or Firm* — Frank A. MacKenzie; Bejin Bieneman PLC

(57) ABSTRACT

An assembly for a vehicle includes a seatbelt buckle, a seatbelt retractor, and webbing retractably extendable from the seatbelt retractor and releasably engageable with the seatbelt buckle. The webbing is extendable from the seatbelt retractor from a fully retracted position toward an extended position. The assembly includes a vibration motor on the seatbelt buckle. The assembly includes a computer having a processor and memory including instructions executable by the processor to activate the vibration motor in response to movement of the webbing from the fully retracted position toward an extended position. The vibration motor provides haptic guidance to an occupant to engage the clip with the seatbelt buckle.

12 Claims, 7 Drawing Sheets

SEATBELT BUCKLE VIBRATION

BACKGROUND

Vehicles are equipped with seat belt assemblies. An example is a three-point harness, which includes a seatbelt retractor and a webbing retractably extendable from the seatbelt retractor. The seatbelt retractor is fixed to the vehicle, e.g., a body of the vehicle, and the webbing is affixed to the vehicle, e.g. the body, at a D-ring above the seatbelt retractor and an anchor at an end of the webbing opposite the seatbelt retractor.

The seatbelt assembly includes a clip slideably engaged with the webbing and a seatbelt buckle. The clip is releasably engageable with the seatbelt buckle to buckle and unbuckle an occupant.

DETAILED DESCRIPTION

Figure 1:
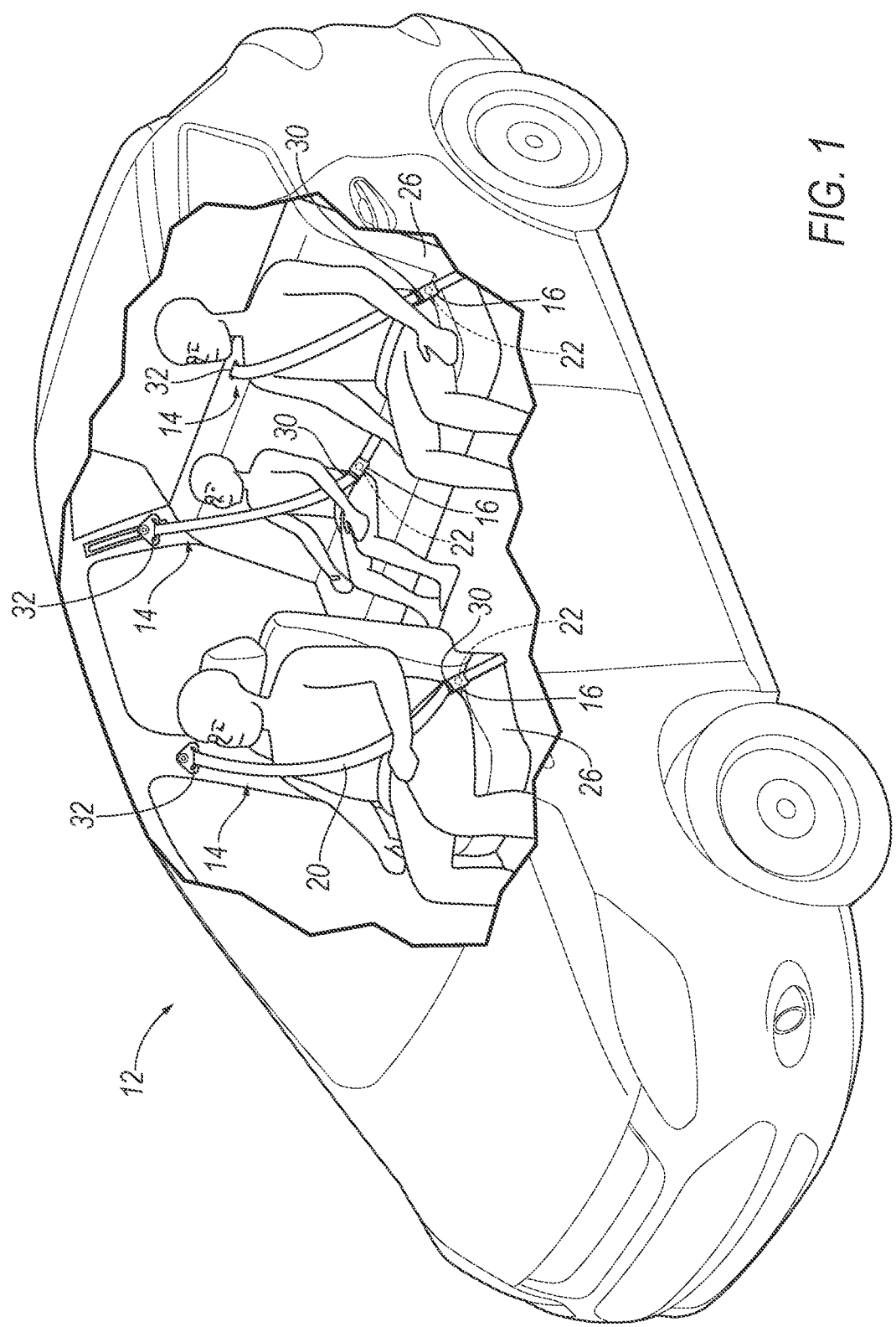
FIG. 1 is a cut-away view of a vehicle including a plurality of seats and a seatbelt assembly for each seat.
Figure 2:
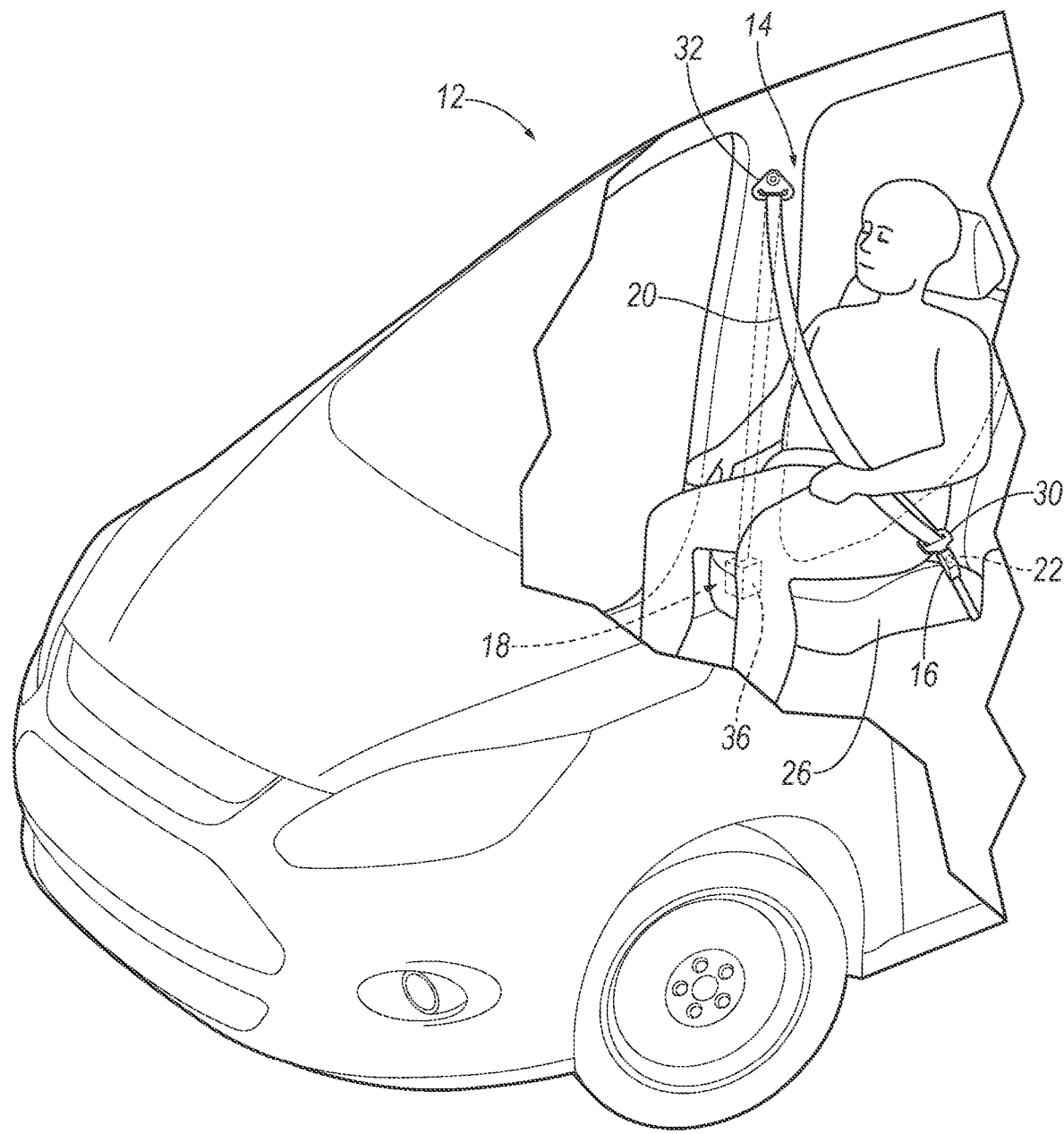
FIG. 2 is a magnified portion of a portion of FIG. 1 showing webbing of the seatbelt assembly in an extended position
Figure 3:
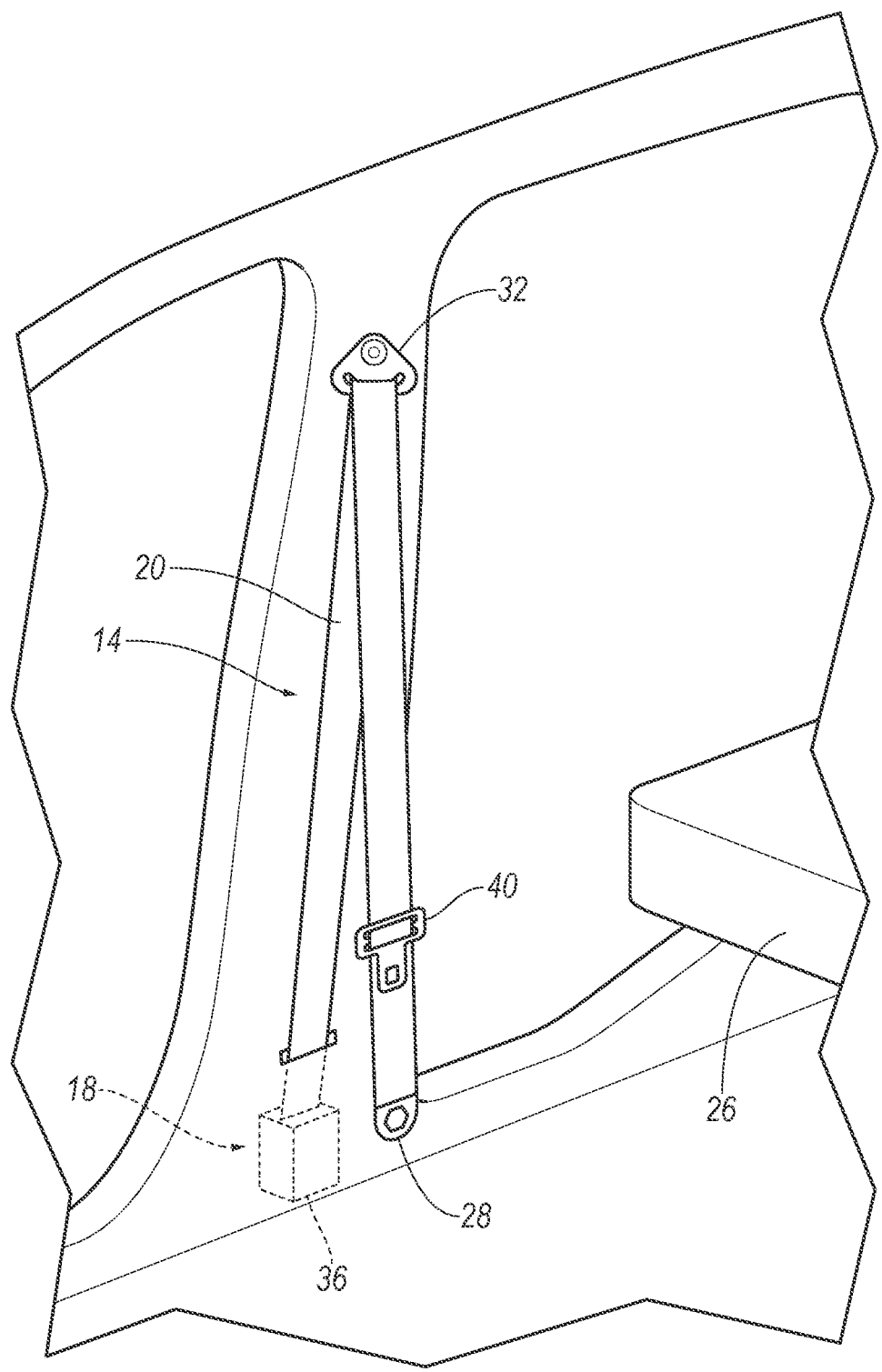
FIG. 3 is a perspective view of a portion of the vehicle including a retractor of a seatbelt assembly shown in broken lines and with the webbing in a fully retracted position.
Figure 4:
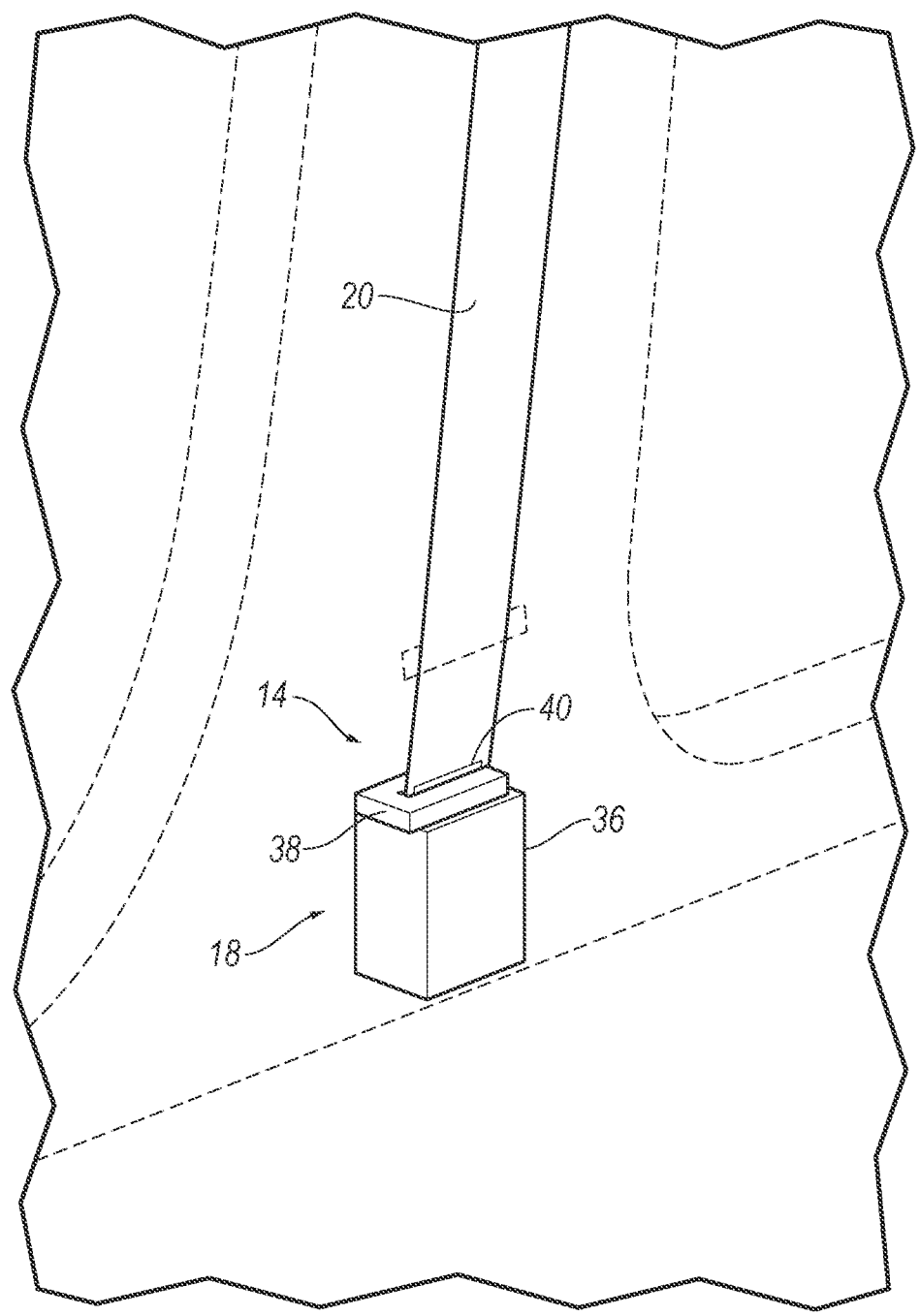
FIG. 4 is a perspective view of a seatbelt retractor and webbing extending therefrom with trim components of a vehicle interior removed to show the seatbelt retractor.

An assembly includes a seatbelt buckle, a seatbelt retractor, and a webbing retractably extendable from the seatbelt retractor and releasably engageable with the seatbelt buckle. The webbing is extendable from the seatbelt retractor from a fully retracted position to an extended position. A vibration motor is on the seatbelt buckle. A computer has a processor and memory including instructions executable by the processor to activate the vibration motor in response to movement of the webbing from the fully retracted position toward an extended position.

The assembly may include a sensor fixed relative to the seatbelt retractor and a marker fixed to the webbing. The marker is detectable by the sensor as the webbing moves from the fully retracted position toward an extended position. The retractor may include a spool. The marker is between the spool and the sensor when the webbing is in the fully retracted position and moves across the sensor as the webbing moves from the fully retracted position toward an extended position.

The instructions may include instructions to deactivate the vibration motor in response to engagement of the webbing with the seatbelt buckle. A clip may be slideably engaged with the webbing. The clip is releasably engageable with the seatbelt buckle to releasably engage the webbing with the seatbelt buckle.

The assembly may include a clip slideably engaged with the webbing. The clip is releasably engageable with the seatbelt buckle to releasably engage the webbing with the seatbelt buckle.

The sensor may be a photointerrupter and the marker may be a section of the webbing that has greater transparency than an adjacent section of the webbing.

A method includes sensing movement of a seatbelt webbing relative to a seatbelt retractor from a fully retracted position toward an extended position and activating a vibration motor on a seatbelt buckle in response to sensing movement of the seatbelt webbing from the fully retracted position toward an extended position.

The method may include deactivating the vibration motor in response to engagement of the webbing with the seatbelt buckle. Deactivating the vibration motor may include deactivating the vibration motor in response to detecting engagement of a clip on the webbing with the seatbelt buckle.

The method may include detecting a marker fixed to the webbing as the webbing moves from the fully retracted position toward an extended position. Sensing movement of the seatbelt webbing may include detecting a difference in transparency between the marker and a section of the webbing adjacent the marker.

With reference to the figures in which like numerals indicate like elements, an assembly 10 for a vehicle 12 includes a seatbelt buckle 16, a seatbelt retractor 18, and webbing 20 retractably extendable from the seatbelt retractor 18 and releasably engageable with the seatbelt buckle 16. The webbing 20 is extendable from the seatbelt retractor 18 from a fully retracted position toward an extended position. The assembly 10 includes a vibration motor 22 on the seatbelt buckle 16. The assembly 10 includes a computer 24 having a processor and memory including instructions executable by the processor to activate the vibration motor 22 in response to movement of the webbing 20 from the fully retracted position toward an extended position.

Since the vibration motor 22 is activated in response to movement of the webbing 20 from the fully retracted position toward an extended position, the vibration motor 22 provides haptic guidance to an occupant to identify the location of the seatbelt buckle 16. Specifically, the vibration motor 22 is activated when the webbing 20 is initially extended from the fully retracted position. Accordingly, when the occupant initially pulls the webbing 20, the vibration motor 22 on the seatbelt buckle 16 vibrates to identify the location of the seatbelt buckle 16 to aid in engagement of the webbing 20 with the seatbelt buckle 16 to belt the occupant to a seat 26. The haptic guidance provided by the vibration motor 22 aids the occupant in identifying the location of the seatbelt buckle 16. As an example, this may be useful for a visually-impaired occupant.

The vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 include a vehicle body (not numbered). The vehicle body includes body panels that may partially define an exterior of the vehicle 12. The body panels may present a class-A surface, e.g., a finished surface exposed to view by a customer and free of unaesthetic blemishes and defects. The body panels include, e.g., pillars (e.g., A-pillar, B-pillar, C-pillar, hinge pillar, etc.) a roof, a floor, etc. The vehicle body defines a passenger compartment (not numbered) to house occupants, if any, of the vehicle 12.

The vehicle 12 includes one or more seats 26. The vehicle 12 may include any suitable number of seats 26. The seats 26 may be arranged in the passenger cabin in any suitable position, i.e., as front seats, rear seats, third-row seats, etc. The seat 26 may be movable relative to the floor to various positions, e.g., movable fore-and-aft and/or cross-vehicle.

The seats 26 may be of any suitable type, e.g., a bucket seat. Any number or all of the seats 26 may include a seatbelt assembly 14. In the example shown in the figures, each of the seats 26 includes the seatbelt assembly 14.

The seatbelt assembly 14 includes the seatbelt buckle 16, the seatbelt retractor 18, and the webbing 20. The seatbelt buckle 16 and the seatbelt retractor 18 are fixed to the vehicle body and/or the seat 26. The seatbelt assembly 14 may include an anchor 28 fixed relative to the webbing 20 and a clip 30 that engages the seatbelt buckle 16. The anchor 28 fixes the seatbelt webbing 20, specifically an end of the webbing 20 distal to the seatbelt retractor 18, to the vehicle body and/or the seat 26. The clip 30 is slideably engaged with the webbing 20.

The clip 30 is releasably engageable with the seatbelt buckle 16. Specifically, the seatbelt buckle 16 and the clip 30 may be of any suitable design so that the occupant can selectively engage and disengage the clip 30 and the seatbelt buckle 16, including designs that are currently known, e.g., a spring-loaded button of the seatbelt buckle 16 that engages a hole in the clip 30. The clip 30 is engaged with the seatbelt buckle 16 to fasten the seatbelt assembly 14 and the clip 30 is disengaged with the seatbelt buckle 16 to unfasten the seatbelt assembly 14. The seatbelt assembly 14, when fastened, retains the occupant on the seat 26, e.g., during sudden decelerations of the vehicle 12. The clip 30 and/or the seatbelt buckle 16 may include a sensor 46 that detects engagement and/or disengagement of the clip 30 and seatbelt buckle 16. The sensor 46 may be in communication with the computer 24, as described further below.

The webbing 20 may extend continuously from the seatbelt retractor 18 to the anchor 28. For example, one end of the webbing 20 feeds into the seatbelt retractor 18 and the other end of the webbing 20 is fixed to the anchor 28. The anchor 28 may, for example, be fixed to the seat 26. As another example, the anchor 28 may be fixed to the vehicle body, e.g., the B-pillar, the floor, etc. The anchor 28 may be attached to the seat 26 in any suitable manner, e.g., with fasteners.

The seatbelt assembly 14 may include a D-ring 32 engaged with the webbing 20. The D-ring 32 may be fixed to the vehicle 12 body, e.g., the B-pillar. The webbing 20 may extend from the anchor 28 through the D-ring 32 to the seatbelt retractor 18 and the webbing 20 may freely slide through the D-ring 32. The D-ring 32 may be spaced from the seatbelt retractor 18. For example, the D-ring 32 may be disposed between the seatbelt retractor 18 and the roof. As another example, the seatbelt retractor 18 may be adjacent to the floor and the D-ring 32 may be adjacent to the roof. The seatbelt assembly 14 may be a three point harness, meaning that the webbing 20 is attached at three points around the occupant when fastened the anchor 28, the seatbelt retractor 18, and the seatbelt buckle 16. The clip 30 slides freely along the webbing 20 and, when engaged with the seatbelt buckle 16, divides the webbing 20 into a lap band and a shoulder band. The seatbelt assembly 14 may, alternatively, include another arrangement of attachment points. The webbing 20 may be fabric, e.g., woven nylon.

The seatbelt retractor 18 may be mounted to the vehicle body. For example, the seatbelt retractor 18 may be attached to the B-pillar. As another example, the seatbelt retractor 18 may be attached to the seat 26. The seatbelt retractor 18 may be attached to the vehicle body or the seat 26 in any suitable manner, e.g., fasteners. The seatbelt retractor 18 may include a housing 36 that is directly connected to the vehicle 12 body.

The webbing 20 is retractably extendable from the seatbelt retractor 18. The seatbelt retractor 18 may be moveable from an unlocked position to a locked position by conventional mechanisms known in the art. In the unlocked position, the webbing 20 may be extended from and retracted into the seatbelt retractor 18. In the locked position, the seatbelt retractor 18 prevents extension of the webbing 20 to limit the forward movement of the occupant. The seatbelt retractor 18 may be in the unlocked position by default, i.e., in the absence of a sudden deceleration. The seatbelt retractor 18 may change from the unlocked position to the locked position during a sudden deceleration of the vehicle 12, i.e., deceleration triggers components of the seatbelt retractor 18 to change from the unlocked position to the locked position.

The seatbelt retractor 18 may be spring-loaded to automatically retract the webbing 20. Specifically, the seatbelt retractor 18 includes a spool 34 that is spring-loaded to automatically retract the webbing 20. The seatbelt retractor 18 may, for example, include a spring (not identified) between the spool 34 and a housing 36 of the seatbelt retractor 18. When an occupant pulls the webbing 20 to extend the webbing 20 from the seatbelt retractor 18, the occupant overcomes the bias of the spring to rotate the spool 34 relative to the housing 36. When the occupant releases, the webbing 20, the spring rotates the spool 34 to retract the webbing 20 to the seatbelt retractor 18, e.g., to tighten the webbing 20 against the occupant when the occupant is seated in the seat 26.

As set forth above, the webbing 20 is extendable from and retractable to the seatbelt retractor 18. Specifically, the webbing 20 is extendable from a fully retracted position toward an extended position. The webbing 20 is extendable to any suitable number of extended positions, e.g., dependent on the size of the occupant, the position of the seat 26, etc. The webbing 20 is in the fully retracted position when, with the clip 30 disengaged from the seatbelt buckle 16 and no other extra forces acting on the webbing 20, the spool 34 retracts the webbing 20 with the webbing 20 hanging down from the seatbelt retractor 18 under the force of gravity. The webbing 20 may be taught in the fully retracted position, e.g., taught from the anchor 28 to the D-ring 32 and taught from the D-ring 32 to the seatbelt retractor 18. In such a configuration, there is no slack in the webbing 20 between the anchor 28 and the seatbelt retractor 18, i.e., no webbing 20 that could be fed to the seatbelt retractor 18 to further retract the webbing 20. Initial movement of the webbing 20 from the fully retracted position toward an extended position, as detected by the sensor 38, is the initial movement of the webbing 20 when pulled by an occupant in an effort to engage the clip 30 with the seatbelt retractor 18. The initial movement of the webbing 20 from the fully retracted position is the first substantial movement of the webbing 20 relative to the seatbelt retractor 18 when an occupant pulls the webbing 20 toward an extended position. The initial movement of the webbing 20 may include a buffer to accommodate for slight movement of the webbing 20 relative to the sensor 38, e.g., avoid detection of movement from bouncing of the webbing 20 during movement of the vehicle 12 when the webbing 20 is in the fully retracted position. As an example, the initial movement may be detected after the first 5 mm of movement of the webbing 20 relative to the sensor 38.

The assembly 10 senses movement of the webbing 20 from the fully retracted position toward an extended position. The assembly 10 may include a sensor 38 fixed relative to the seatbelt retractor 18 and a marker 40 fixed to the webbing 20. The marker 40 is detectable by the sensor 38 as the webbing 20 moves from the fully retracted position toward an extended position. Specifically, the marker 40 detects initial movement of the webbing 20 from the fully retracted position toward an extended position. As another example, the sensor 38 may detect movement of the spool 34 relative to the housing 36. In such an example, the sensor 38 may detect a home position of the spool 34 when the webbing 20 is in the fully retracted position and may sense movement, e.g., rotation, from that home position.

In examples in which the assembly 10 includes the marker 40 on the webbing 20, the sensor 38 may be, for example, fixed to the seatbelt retractor 18, e.g., fixed directly to the housing 36 of the seatbelt retractor 18. As another example, the may be fixed directly to the vehicle 12 body. In such examples, the sensor 38 is positioned to detect movement of the marker 40 when the webbing 20 moves from the fully retracted position toward an extended position.

Figure 5:
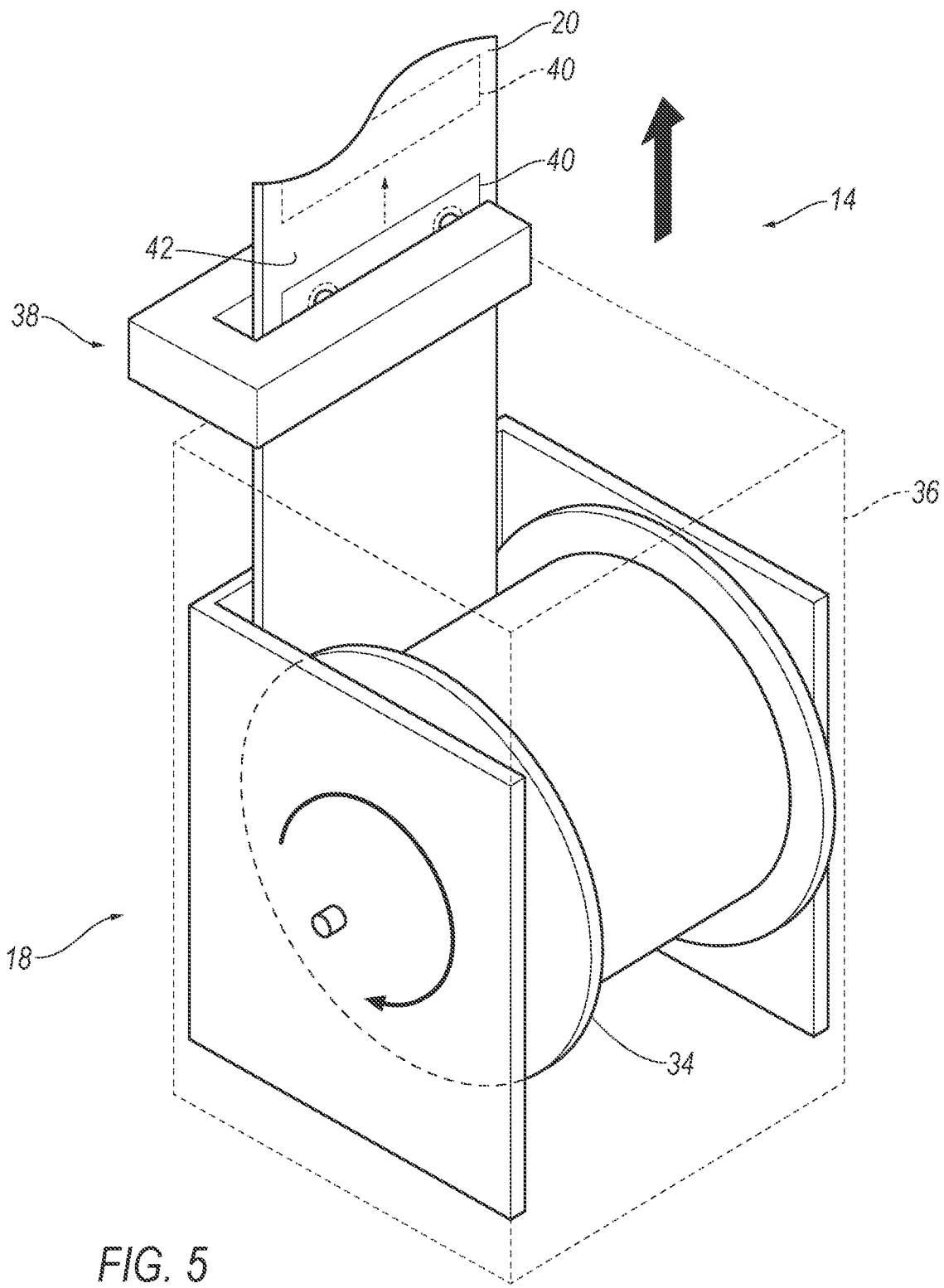
FIG. 5 is a perspective view of the seatbelt retractor with a housing of the seatbelt retractor shown in broken lines.
Figure 6:
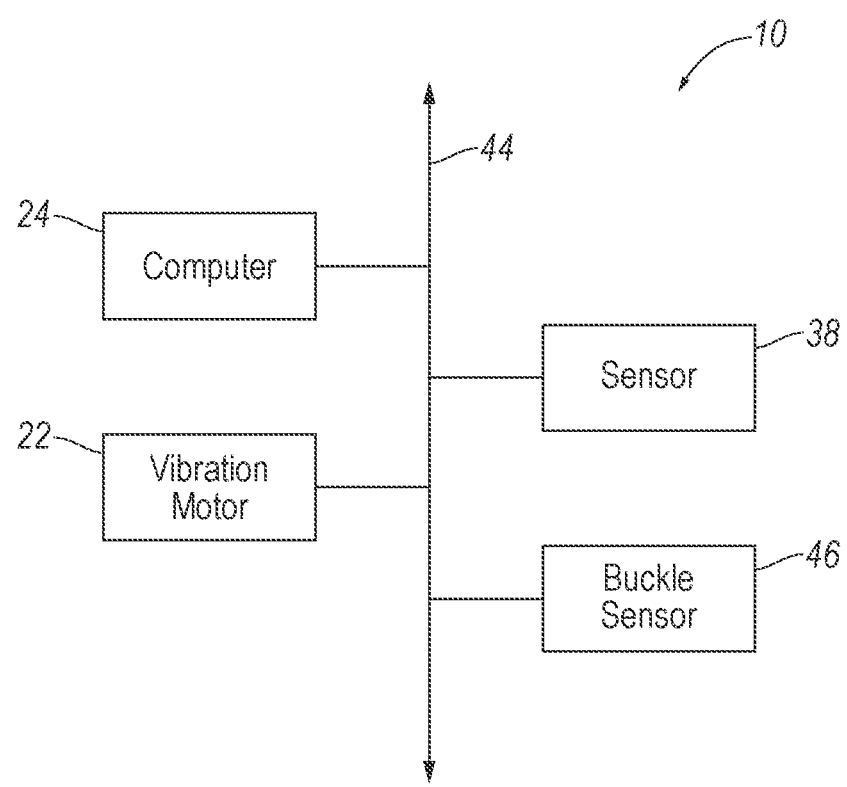
FIG. 6 is a block diagram of a system of the vehicle.

As set forth above, the marker 40 is fixed to the webbing 20. Specifically, the marker 40 moves as a unit with the webbing 20. For example, in FIG. 5, the position of the marker 40 is shown in solid lines within a field of detection of the sensor 38, i.e., when the webbing 20 is in the fully retracted position, and the position of the marker 40 is shown in broken lines outside of the field of detection of the sensor 38, i.e., when the webbing 20 is in an extended position. The marker 40 is positioned on the webbing 20 to be detected by the sensor 38 when the webbing 20 moves from the fully retracted position toward an extended position. As an example, the marker 40 may be positioned to be detected by the sensor 38 when the webbing 20 is in the fully retracted position such that the sensor 38 detects movement of the webbing 20 from the fully retracted position toward an extended position. In other words, the sensor 38 has a field of detection and the marker 40 is positioned on the webbing 20 to be moved into or out of the field of detection as the webbing 20 moves from the fully retracted position toward an extended position. In such an example, the sensor 38 may detect relative movement of the marker 40 or may detect absence of the marker 40 as the marker 40 moves to a position not detectable by the sensor 38 during initial movement of the webbing 20 from the fully retracted position toward an extended position. The marker 40 may be, for example, between the spool 34 and the sensor 38 when the webbing 20 is in the fully retracted position and moves across the sensor 38 as the webbing 20 moves from the fully retracted position toward an extended position As another example, the marker 40 may be positioned to move into a position in which the presence of the marker 40 is detected by the sensor 38 during initial movement of the webbing 20 from the fully retracted position toward an extended position.

The sensor 38 may be, for example, a photointerrupter and the marker 40 may be a section of the webbing 20 that has greater transparency than an adjacent section of the webbing 20, i.e., a lower transparency section 42 that has a relatively lower transparency than the marker 40. In other words, the marker 40 may be a woven section of the webbing 20. In the example in which the sensor 38 is a photodetector and the marker 40 is a section of the webbing 20, the photointerrupter may include a light-emitting element and a light-receiving element facing the light-emitting element with the webbing 20 disposed between the light-emitting element and the light-receiving element. In the example shown in FIG. 5, the sensor 38 wraps around the webbing 20 and, more specifically, includes a slot that receives the webbing 20. The light-receiving element is positioned to detect light from the light-emitting element. The marker 40, when between the light-emitting element and the light-receiving element, transmits more light from the light-emitting element to the light-receiving element than the lower transparency section 42 between the light-emitting element and the light-receiving element. The movement of the webbing 20 from the fully-retracted position toward an extended position is detected by the sensor 38 as changes in light from the light-emitting element through the webbing 20, i.e., differences through the marker 40 and the lower transparency section 42. The difference in transparency between the marker 40 and the lower transparency section 42 may be, for example, due to difference in color, e.g., differences in thread color of the marker 40 and thread color of the webbing 20. The lower transparency section 42 may be, for example, positioned to be in the field of detection of the sensor 38 when the webbing 20 is in the fully retracted position and to be outside of a field of detection of the sensor 38 when the webbing 20 moves from the fully retracted position toward an extended position. As another example, the lower transparency section 42 may be positioned to be outside of the field of detection of the sensor 38 when the webbing 20 is in the fully retracted position and to be inside of the field of detection of the sensor 38 when the webbing 20 moves from the fully retracted position toward an extended position.

Other examples of the sensor 38 and the marker 40 include an example in which the marker 40 is more or less reflective than an adjacent section of the webbing 20 and the sensor 38 detects changes in sensed reflectivity when the webbing 20 moves from the fully retracted position toward an extended position; the marker 40 is magnetic and the sensor 38 is a hall-effect sensor that detects changes in magnetic fields when the webbing 20 moves from the fully retracted position toward an extended position; the marker 40 is a different color than an adjacent section of the webbing 20 and the sensor 38 detects change in color in the field of detection of the sensor 38, etc. Alternatively, the sensor 38 and the marker 40 may be of any suitable type such that initial movement of the webbing 20 from the fully retracted position toward an extended position is detected by the sensor 38.

The vibration motor 22, when activated, vibrates with sufficient frequency and magnitude to be detected by the occupant when seated in the seat 26. The vibration motor 22 may, for example, include an internal mass that is eccentric so as to cause vibration when rotated. As another example, the vibration motor 22 may include an internal mass attached to a spring and driven, e.g., magnetically, mechanically, etc., to vibrate the rest of the vibration motor 22. Alternatively, the vibration motor 22 may be of any suitable type sufficient to cause vibration detected by the occupant to aid in engagement of the clip 30 with the buckle.

The vibration motor 22 is on the seatbelt buckle 16. As an example, the seatbelt buckle 16 may include an outer casing and the vibration motor 22 may be fixed to the outer casing. In any event, vibration of the vibration motor 22 is of a magnitude and frequency that may be detected by touch of any occupant to an outer surface of the seatbelt buckle 16.

The computer 24 is in communication with the sensor 38 and the vibration motor 22 to data from the sensor 38 indicating movement of webbing 20 from the fully retracted position toward an extended position and, in response, to instruct activation of the vibration motor 22, as described further below. The computer 24 may be, for example, referred to in industry as a restraints control module.

The computer 24 may include a processor and a memory. The memory includes one or more forms of computer readable media, and stores instructions executable by the computer 24 for performing various operations, including as disclosed herein. For example, the computer 24 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 24 may include an FPGA Field-Programmable Gate Array which is an integrated circuit manufactured to be configurable by a user. Typically, a hardware description language such as VHDL Very High Speed Integrated Circuit Hardware Description Language is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processors, ASICs, and/or FPGA circuits may be included in a computer 24. The memory can be of any type, e.g., hard disk drives, solid state drives, servers, or any volatile or non-volatile media. The memory can store the collected data sent from the sensors. The memory can be a separate device from the computer 24, and the computer 24 can retrieve information stored by the memory via a network in the vehicle 12, e.g., over a CAN bus, a wireless network, etc. Alternatively or additionally, the memory can be part of the computer 24, e.g., as a memory of the computer 24. The computer 24 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 24, as opposed to a human operator, is to control such operations. Additionally, the computer 24 may be programmed to determine whether and when a human operator is to control such operations. The computer 24 may include or be communicatively coupled to, e.g., via a vehicle network such as a communications bus as described further below, more than one processor, e.g., included in components such as sensors, electronic controller units ECUs or the like included in the vehicle 12 for monitoring and/or controlling various vehicle components, e.g., a powertrain controller, a brake controller, a steering controller, etc. The computer 24 is generally arranged for communications on a communication network 44 that can include a bus in the vehicle 12 such as a controller area network CAN or the like, and/or other wired and/or wireless mechanisms. Alternatively or additionally, in cases where the computer 24 actually comprises a plurality of devices, the communication network 44 may be used for communications between devices represented as the computer 24 in this disclosure. Further, as mentioned below, various controllers and/or sensors may provide data to the computer 24 via the communication network 44. The computer 24 is programmed to perform the method 700 shown in FIG. 7, e.g., the memory includes instructions executable by the processor to perform the method 700. Throughout this application, use of in response to, based on, and upon determining indicates a causal relationship, not merely a temporal relationship.

The instructions include instructions to activate the vibration motor 22 in response to movement of the webbing 20 from the fully retracted position toward an extended position. For example, with reference to block 705, the method 700 starts by sensing movement of the webbing 20 from the fully retracted position toward an extended position is detected. For example, sensing movement of the webbing 20 may initiate the method 700. Specifically, the sensor 38 detects movement of the webbing 20. For example, as set forth above, the sensor 38 may detect movement of the marker 40. Specifically, sensing movement of the seatbelt webbing 20 may include detecting a difference in transparency between the marker 40 and a section of the webbing 20 adjacent the marker 40, as described above.

The instructions include instructions to activate the vibration motor 22 in response to detection of movement of the webbing 20 from the fully retracted position toward an extended position. In other words, this detection causes activation of the vibration motor 22.

Figure 7:
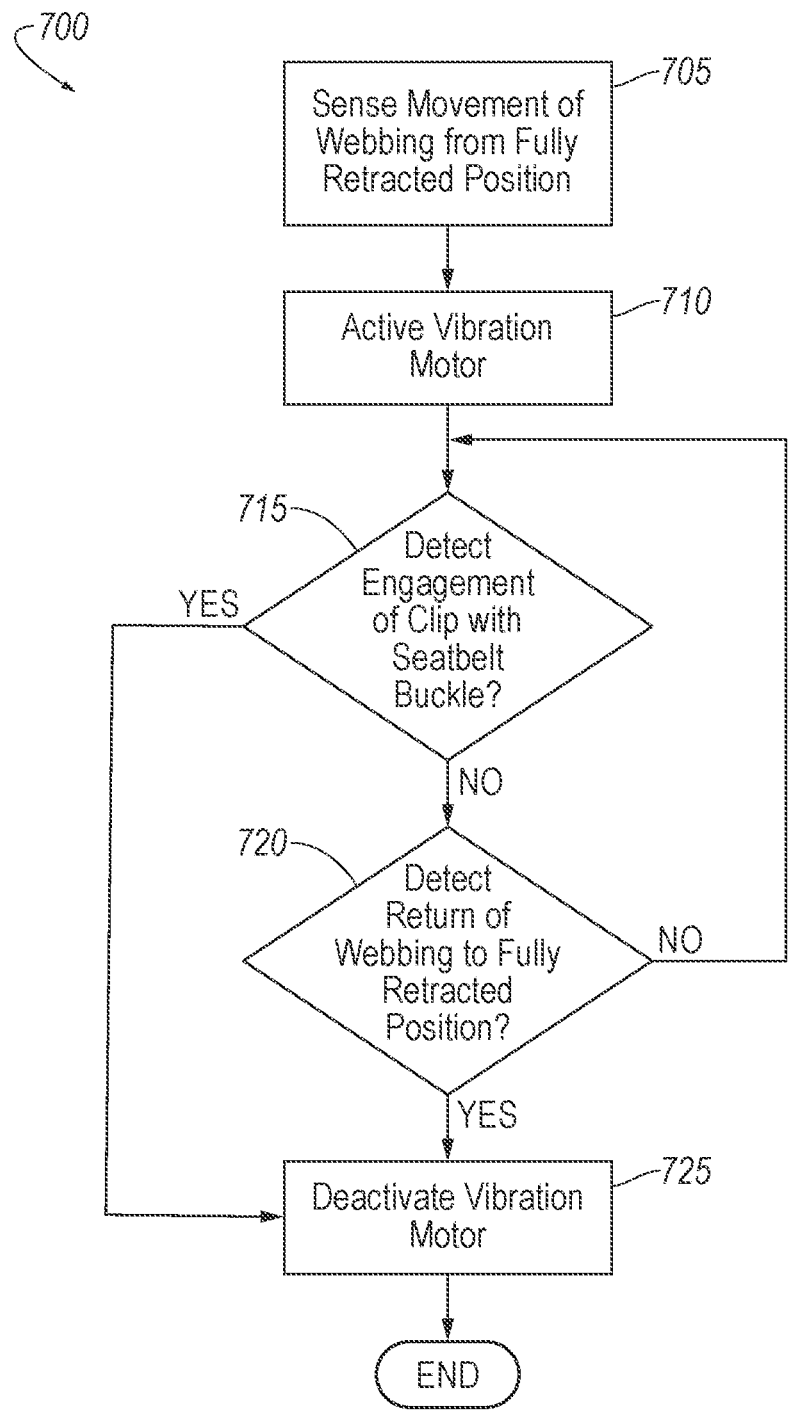
FIG. 7 is a flow chart of an example method performed by a computer of the system of the vehicle.

The instructions include instructions to detect engagement of the clip 30 with the seatbelt buckle 16. As an example, the clip 30 and/or the seatbelt buckle 16 may include a buckle sensor 46 that detect engagement and/or disengagement of the clip 30 with the seatbelt buckle 16. With reference to FIG. 7, the method may include detecting engagement of the clip 30 with the seatbelt buckle 16.

The instructions include instructions to deactivate the vibration motor 22 in response to engagement of the webbing 20 with the seatbelt buckle 16. With reference to block 725, the method 700 includes deactivating the vibration motor 22 in response to engagement of the webbing 20 with the seatbelt buckle 16. Specifically, deactivating the vibration motor 22 may include deactivating the vibration motor 22 in response to detecting engagement of a clip 30 on the webbing 20 with the seatbelt buckle 16.

The instructions include instructions to deactivate the vibration motor 22 in response to detection of return of the webbing 20 from an extended position to the fully retracted position. With continued reference to block 715, if engagement of the clip 30 with the seatbelt buckle 16 is not detected, the method may include detecting return of the webbing 20 to the fully retracted position. With reference to block 720, if return of the webbing 20 to the fully retracted position is detected, the vibration motor 22 is deactivated in block 725. If return of the webbing 20 to the fully retracted position is not detected in block 720, the method repeats block 715.

In operation, when an occupant is seated in the seat 26, the occupant may grasp the webbing 20 and pull the webbing 20 from the retractor from the fully retracted position toward an extended position. In response to the movement of the webbing 20, the computer 24 instructs activation of the vibration motor 22 to provide haptic guidance to the occupant. The vibration of the vibration motor 22 on the seatbelt buckle 16 may be felt by the occupant, e.g., the legs of the occupant, the hand of the occupant searching for the seatbelt buckle 16, etc., to aid in guiding the clip 30 to the seatbelt buckle 16. If the occupant engages the clip 30 with the seatbelt buckle 16, the computer 24 instructs the vibration motor 22 to be deactivated, i.e., to stop vibrating. Likewise, if the occupant releases the webbing 20 and the webbing 20 returns to the fully retracted position, the computer 24 instructs the vibration motor 22 to be deactivated.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
   a seatbelt buckle;
   a seatbelt retractor;
   webbing retractably extendable from the seatbelt retractor and releasably engageable with the seatbelt buckle, the webbing being extendable from the seatbelt retractor from a fully retracted position to an extended position;
   a vibration motor on the seatbelt buckle; and
   a computer having a processor and memory including instructions executable by the processor to activate the vibration motor in response to movement of the webbing from the fully retracted position toward an extended position.

2. The assembly of claim 1, further comprising a sensor fixed relative to the seatbelt retractor and a marker fixed to the webbing, the marker being detectable by the sensor as the webbing moves from the fully retracted position toward an extended position.

3. The assembly of claim 2, wherein the retractor includes a spool, the marker is between the spool and the sensor when the webbing is in the fully retracted position and moves across the sensor as the webbing moves from the fully retracted position toward an extended position.

4. The assembly of claim 1, wherein the instructions include instructions to deactivate the vibration motor in response to engagement of the webbing with the seatbelt buckle.

5. The assembly of claim 4, further comprising a clip slideably engaged with the webbing, the clip being releasably engageable with the seatbelt buckle to releasably engage the webbing with the seatbelt buckle.

6. The assembly of claim 1, further comprising a clip slideably engaged with the webbing, the clip being releasably engageable with the seatbelt buckle to releasably engage the webbing with the seatbelt buckle.

7. The assembly of claim 2, wherein the sensor is a photointerrupter and the marker is a section of the webbing that has greater transparency than an adjacent section of the webbing.

8. A method comprising:
   sensing movement of a seatbelt webbing relative to a seatbelt retractor from a fully retracted position toward an extended position; and
   activating a vibration motor on a seatbelt buckle in response to sensing movement of the seatbelt webbing from the fully retracted position toward an extended position.

9. The method as set forth in claim 8, further comprising deactivating the vibration motor in response to engagement of the webbing with the seatbelt buckle.

10. The method as set forth in claim 9, wherein deactivating the vibration motor includes deactivating the vibration motor in response to detecting engagement of a clip on the webbing with the seatbelt buckle.

11. The method as set forth in claim 8, further comprising detecting a marker fixed to the webbing as the webbing moves from the fully retracted position toward an extended position.

12. The method as set forth in claim 11, wherein sensing movement of the seatbelt webbing includes detecting a difference in transparency between the marker and a section of the webbing adjacent the marker.

* * * * *